W. JAY.

LIQUID FEEDING APPARATUS.

APPLICATION FILED AUG. 6, 1917.

Reissued Sept. 11, 1917.

14,353.

2 SHEETS—SHEET 1.

Inventor:
Webb Jay,
by Burton & Burton
his Attys.

Witness:
[illegible]

W. JAY.

LIQUID FEEDING APPARATUS.

APPLICATION FILED AUG. 6, 1917.

Reissued Sept. 11, 1917.

14,353.

2 SHEETS—SHEET 2.

Witness:

Geo. F. Clouston

Inventor

Webb Jay, by Burton & Burton his Attys.

UNITED STATES PATENT OFFICE.

WEBB JAY, OF CHICAGO, ILLINOIS.

LIQUID-FEEDING APPARATUS.

14,353. Specification of Reissued Letters Patent. Reissued Sept. 11, 1917.

Original application filed August 31, 1914, Serial No. 859,312. Divided and application filed October 26, 1914, Serial No. 868,581. Original No. 1,158,924, dated November 2, 1915. Application for reissue filed August 6, 1917. Serial No. 184,789.

*To all whom it may concern:*

Be it known that I, WEBB JAY, a citizen of the United States, residing at Chicago, in the county of Cook and State of Illinois, have invented new and useful Improvements in Liquid-Feeding Apparatus, of which the following is a specification, reference being had to the accompanying drawings, forming a part thereof.

This application is a division of my application No. 859,312, filed August 31, 1914, (Patent No. 1,125,549, dated January 19, 1915).

The purpose of the present invention is to provide an improved liquid feeding apparatus and particularly the tank structure therefor.

It consists in the elements and features of construction shown and described, as indicated in the claims.

Figure 1:
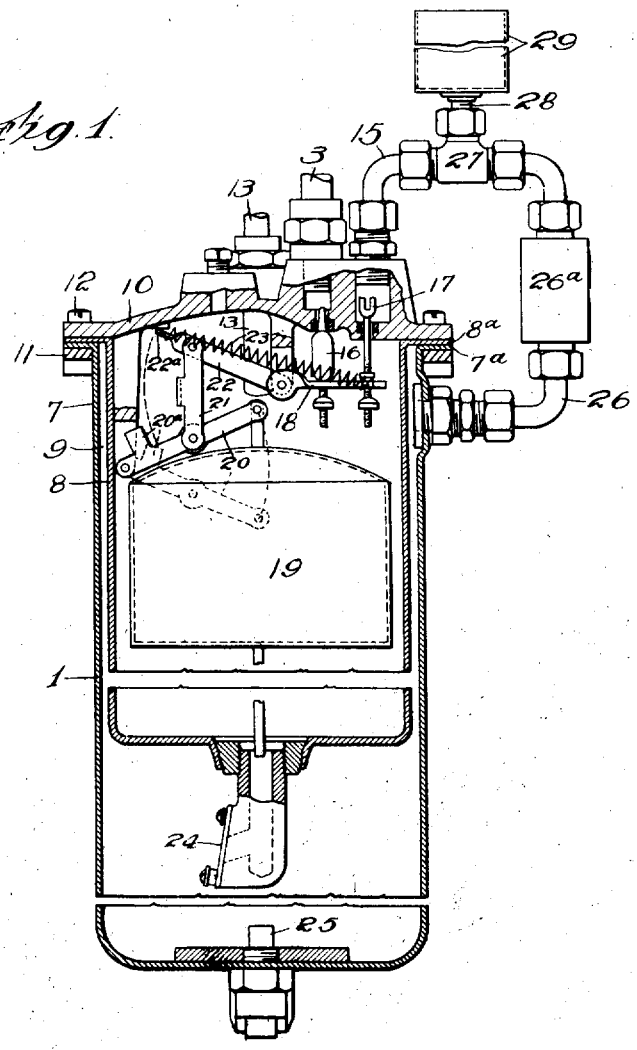
Figure 1 is a vertical sectional view of a device embodying this invention.
Figure 7:
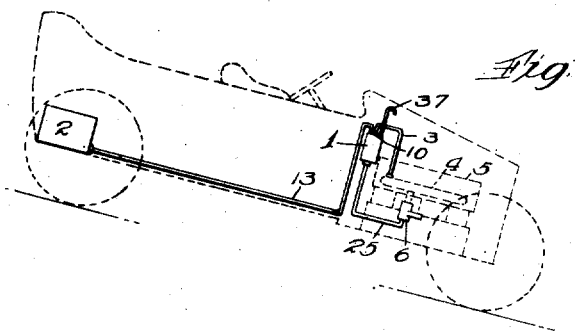
Fig. 7 is a side elevation of an automobile equipped with this invention.
Figure 2:
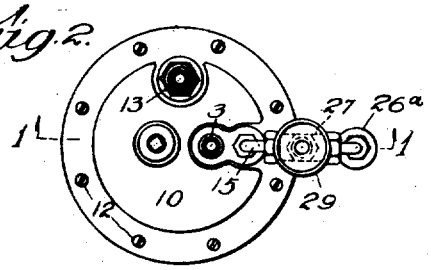
Fig. 2 is a top plan view of the same.

The apparatus shown in the drawings consists of a tank, 1, designed to have communication with a main storage or supply tank, 2, but positioned at a lower level, and also designed to have communication with means for reducing the pressure within the auxiliary tank, said means consisting in a pipe, 3, designed to lead from the device shown to the intake of the manifold of an explosive motor, 5, whereby the suction of the motor may be utilized to create a reduction of pressure in the tank, 1. By reason of such reduction of pressure, it will be understood that the liquid fuel in the main supply tank, 2, will be lifted to auxiliary tank, 1, whence it is permitted to flow by gravity to the carbureter of the motor, 5.

Fig. 1 illustrates the details of construction of the tank, 1. For reasons which require no explanation, it is necessary, or at least desirable, that the auxiliary tank, 1, consist of two chambers, in one of which there is contained a float mechanism by which the various valves are controlled, and the other of which serves as an auxiliary reservoir from which the liquid fuel may flow to the point of use, as to the engine carbureter. As indicated in Fig. 1, these two chambers are constituted as two separate cups or vessels, each opening upwardly and each provided with a transversely extending flange at its upper end. The outer vessel, 7, is considerably longer or deeper than the inner vessel, 8, and sufficiently larger in diameter to leave an annular space, 9, between the two when they are telescoped concentrically together. The vessel, 8, is thus suspended within the vessel, 7, by lodgment of its flange, $8^a$, upon the flange, $7^a$, of the vessel, 7, and the parts are secured together in this position by means of a cover, 10, and a clamp ring, 11, connected by bolts, 12, which pass through the flanges, $7^a$ and $8^a$. This construction avoids the difficulties which might arise in brazing a partition wall in a single outer vessel, and affords certain other advantages, as hereinafter explained.

Figure 6:
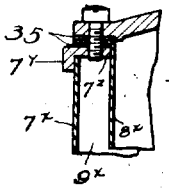
Fig. 6 is a detail section of the form of the device shown in Fig. 5 at the same plane as Fig. 5, at the opposite side of the device at the upper corner thereof.

The cover, 10, is provided with a fuel intake opening connected by the pipe, 13, with the supply tank, 2, as shown in Fig. 6, another opening connected by pipe, 3, with the intake manifold, 4, of the engine, 5, and a third opening fitted with a pipe, 15, communicating with the outer air. It should be understood that the pipes, 3 and 15, are controlled by valves, 16 and 17, respectively, which are so connected to a lever, 18, that they can only open alternately. When the valve, 16, is open and the valve, 17, is closed, the engine suction is permitted to effect a reduction of pressure within the vessel, 8, thus causing a flow of fuel through the pipe, 13, into the vessel and causing the float, 19, to rise. The float, 19, is connected, however, by a lever, 20, and link, 21, to an arm, 22, fulcrumed co-axially with the lever, 18, and serving to support one end of a tension spring, 23, whose opposite end is connected to the lever, 18. The spring, 23, thus tending to fold the members 18 and 22, toward each other, either above or below their fulcrum, serves to resist the rise of the float, 19, since it would cause an unfolding of said members and the rise of the float is consequently delayed until the buoyant force of the constantly incoming liquid is sufficient to overcome the effect of the spring, 23. The float then rises suddenly to its upper limit of movement, throwing the parts to the positions indicated in full lines in Fig. 1. The pull of the spring, 23, causes sufficient upward swing of the lever, 18, to unseat the air valve, 17, and to seat the valve, 16, thus cutting off the engine suction and restoring atmospheric pressure within the vessel, 8. This permits the fuel accumulated in the vessel, 8, to flow downward into the vessel, 7 past the flap valve, 24, and from the vessel, 7, it will flow by gravity through the pipe, 25, to the carbureter, 6. When the majority of the fuel has passed from the vessel, 8, to the vessel, 7, the buoyant force being thus removed from the float, 19, the latter will fall to its lower limit which is determined by the engagement of the stop shoulder $20^a$, with the projecting end, $22^a$, of the member, 22, as the latter is folded downward by the weight of the float acting through the link, 21.

To insure the free flow of the liquid from the vessel, 7, however, it is essential that this chamber have communication with the atmosphere at all times, and in the present construction this is afforded through the annular space, 9 from which a pipe, 26, leads to a T fitting, 27, whose stem, 28, is open to the air. The other arm of the T fitting, 27, is coupled to the pipe, 15, whereby the pipe, 28 serves as a common air vent for both chambers as occasion requires. It will be understood that with the tank, 1, located in the vicinity of the engine, the liquid fuel within it will usually become heated to a temperature higher than that in the supply tank, 2, and will increase in volume. Such increase within the vessel, 7, is accommodated by the annular space, 9, and the pipe, 26 into which the liquid may rise without interfering with the operation of the device. When this expansion of the liquid is due to heat affecting the lower portion of the vessel, 1, such heat is likely to cause more or less volatilization of the fuel in this lower portion of the vessel, but if the liquid has already risen into the pipe, 26, the volatilized portion will tend simply to elevate the liquid portion still farther, instead of escaping from it in the form of bubbles. It is, therefore, desirable to provide in the pipe, 26 a chamber, $26^a$, having a considerably greater cross section than the pipe, 26, thus affording sufficient area at the surface of the liquid to permit escape of the confined gas in the form of bubbles and prevent any undue rise in the level of the liquid from this cause.

Figure 3:
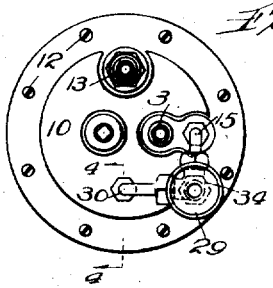
Fig. 3 is a top plan view of a modification.
Figure 4:
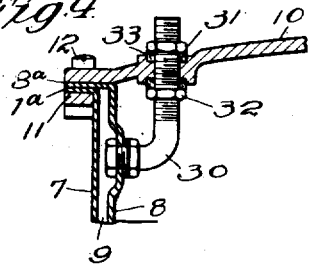
Fig. 4 is a detail section taken as indicated at line, 4—4, on Fig. 3.

If desired, the lateral projection of the pipe, 26, may be entirely avoided by substituting a pipe, 30, connecting with the annular space, 9, but passing through the chamber 8 and through the cover, 10, as indicated in Figs. 3 and 4. In this case the cover, 10, is apertured to accommodate the pipe, 30, throughout its extent through the cover and fitting it with clamping nuts, 31, and 32, and packing washers, 33. The T fitting, 27 may then be replaced by an elbow, 34, connected to the end of the pipe, 30, and this elbow with its cup, 29, will then project upward within the circumference of the cover, 10.

Figure 5:
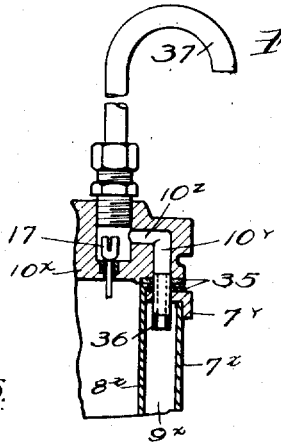
Fig. 5 is a detail section of a modified construction alternative with that shown in Fig. 4.

Fig. 5 illustrates an even more compact construction in which the outer tank or vessel, $7^x$, is provided with an applied flange, $7^y$, preferably of heavier material than the body of the tank, and this flange is provided with threaded apertures, $7^z$, to receive the screws, 12, by which the head, $10^x$, is clamped in place. Packing washers, 35, are positioned between these parts to render the construction gas-tight. In this construction the space, $9^x$, is several times greater than the form shown in Fig. 1, and is adequate for all the expansion which can occur of the liquid contained in the chamber, $7^x$; and, particularly, its cross-sectional area is adequate to permit any vapor which is generated in the lower part of the chamber to escape freely through the liquid in said annular space; and the vent pipe from said annular space consists simply of a short tube, 36, fixed in the flange, $7^y$, protruding into a recess $10^y$, in the head, $10^x$. This recess communicates with a duct, $10^z$, formed in the cast head, $10^x$, and leading into the space above the valve, 17, thus affording a common air vent for the two chambers of the device. In view of the adequate provision by means of the capacity of the annular space, $9^x$, it will be noticed that this construction is without the expansion chamber, $26^a$, shown in the form illustrated in Fig. 1. Instead of the cup, 29, this air vent may be fitted with a goose neck, 37, of sufficient length to accommodate a rise of level due to the inclination of the vehicle upon any ordinary grade, and by reason of its shape serving to prevent the entrance of dust or other impurities which might interfere with proper seating of the valve, 17, or which might contaminate the fuel.

I claim:—

1. A tank for the purpose indicated, comprising two chambers, one of which extends lower than the other; connections for the discharge of liquid from said other into said lower chamber, the lower chamber being extended above the level of the bottom of the other chamber, the cross-sectional area in such extension being adequate for the free escape of vapor through the liquid which may be in such extension, and an air vent from the upper part of said extension.

2. A tank for the purpose indicated comprising two chambers, one suspended within the other, an upwardly opening air inlet for one chamber, an air inlet for the other chamber comprising a conduit communicating with the lateral space between the chambers, and a common air vent connecting the two air inlets above the tank.

3. A tank for the purpose indicated comprising two chambers constructed of two upwardly opening vessels, one vessel having a rim flange extending toward its axis, the other vessel having a rim flange extending away from its axis, the second vessel being suspended within the first vessel by the seating of such flange upon the flange of the first, a cover seated over said flanges, and means clamping together the cover and the flange of the first vessel with the flange of the other vessel between them.

4. A tank for the purpose indicated comprising two chambers constructed of two upwardly opening vessels each having a flanged rim, one of said vessels being suspended within the other by the seating of its flange upon the flange of the other, a cover seated over said flanges, said cover having an aperture serving as an air vent for the inner vessel, the flange of said vessel having an aperture communicating with the lateral space between the chambers and the cover having a duct positioned to register with said aperture and leading to the aforesaid vent aperture, and means securing said cover to the flange of the outer vessel with the flange of the inner vessel interposed.

5. In a motor vehicle, an auxiliary fuel tank positioned above the fuel inlet of the motor, and comprising two chambers, one of which is telescoped within the other so as to form an annular portion of one chamber around the other; the top plate of said tank having a passage which communicates both with the inner chamber and with said annular portion of the other chamber, and an air vent or pipe connected with said passage and extending above the normal level of liquid in the tank, and terminating in a downwardly opening portion.

In testimony whereof, I have hereunto set my hand at Chicago, Illinois, this 14th day of June, 1917.

WEBB JAY.